(12) United States Patent
Reijonen et al.

(10) Patent No.: US 11,566,495 B2
(45) Date of Patent: Jan. 31, 2023

(54) COMPACT HIGH-VOLTAGE POWER SUPPLY SYSTEMS AND METHODS

(71) Applicant: Schlumberger Technology Corporation, Sugar Land, TX (US)

(72) Inventors: Jani Reijonen, Sugar Land, TX (US); Giovana Stefan, Sugar Land, TX (US); Austin Jones, Burlington, NJ (US); Matthieu Simon, Cambridge, MA (US); Anthony Durkowski, Round Rock, TX (US); Marc-Andre de Looz, Sugar Land, TX (US); Justin Mlcak, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 44 days.

(21) Appl. No.: 16/723,222

(22) Filed: Dec. 20, 2019

(65) Prior Publication Data
US 2021/0189838 A1 Jun. 24, 2021

(51) Int. Cl.
*H02M 7/10* (2006.01)
*E21B 41/00* (2006.01)
*H05H 3/06* (2006.01)
*H01G 4/40* (2006.01)
*H02J 7/34* (2006.01)
*E21B 47/01* (2012.01)

(52) U.S. Cl.
CPC .......... *E21B 41/0085* (2013.01); *H01G 4/40* (2013.01); *H02J 7/345* (2013.01); *H02M 7/106* (2013.01); *H05H 3/06* (2013.01); *E21B 47/01* (2013.01)

(58) Field of Classification Search
CPC .. H05H 3/06; H02J 7/106; H02J 7/103; H02J 7/10; H02J 7/345; H01G 4/40; H01G 4/38; H01G 4/385; H01G 4/30; E21B 47/01; E21B 41/0085
See application file for complete search history.

(56) References Cited

U.S. PATENT DOCUMENTS

| | | | | |
|---|---|---|---|---|
| 3,723,846 A | * | 3/1973 | Thompson, Jr. | H02M 7/106 361/275.1 |
| 4,010,535 A | * | 3/1977 | Hishiki | H02M 3/335 29/825 |
| 4,554,622 A | * | 11/1985 | Mommsen | H01L 25/072 361/328 |
| 2010/0135052 A1 | * | 6/2010 | Luerkens | H02M 3/07 363/61 |
| 2010/0226155 A1 | * | 9/2010 | Hanington | H02M 7/106 363/125 |
| 2014/0077886 A1 | * | 3/2014 | Gorrell | H03F 3/10 330/310 |
| 2016/0308434 A1 | * | 10/2016 | Warmack | H02M 7/106 |
| 2017/0179818 A1 | * | 6/2017 | Gould | E21B 47/00 |

* cited by examiner

*Primary Examiner* — Nguyen Tran
(74) *Attorney, Agent, or Firm* — Frederick Carbone (57) ABSTRACT

A downhole tool may include a high-voltage power supply disposed within a housing to transform input power to the downhole tool from a first voltage to a second voltage greater than the first voltage. The high-voltage power supply may include an array of capacitors, which may include multiple rows of capacitors. The rows of capacitors may be parallel with a symmetric cross section as viewed from an end of the array of capacitors. The high-voltage power supply may also include diodes electrically coupled to the array of capacitors.

4 Claims, 7 Drawing Sheets

COMPACT HIGH-VOLTAGE POWER SUPPLY SYSTEMS AND METHODS

BACKGROUND

This disclosure relates generally to systems and methods for a compact high-voltage power supply, for example, as used in a nuclear or photonic radiation generator in downhole tools. Furthermore, although discussed herein in the context of downhole tools, the systems and methods of this disclosure may be applicable in any suitable high-voltage power supply.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed into the wellbore. The tools may be used to infer properties and characteristics of the geological formation surrounding the wellbore and, thus, make informed decisions. Some such tools may include a radiation generator, to irradiate the wellbore with nuclear radiation, and sensors to make inferences from the wellbore's response to the radiation.

Generally, an electrically operated radiation generator, such as an x-ray generator, a gamma ray generator, or a neutron generator, may generate radiation using electrical power. The emitted radiation that results may facilitate determining characteristics of the surrounding environment (e.g., the formation). Thus, radiation generators may be used in various contexts, such as for material analysis in a downhole tool or in a laboratory. A high-voltage power supply may provide electrical power that is converted to high energy radiation the radiation generator. Given the size limitations of downhole tools, the high-voltage power supply and radiation generator may be packaged in a relatively small housing. However, placing high-voltage components, such as high-voltage multiplier ladder components, in close proximity to each other and/or to relative ground may lead to high electric field stresses and/or electrical complications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electrically operated downhole tool, such as a nuclear radiation generator, may generate radiation (e.g., x-rays, gamma rays, neutrons, etc.) using electrical power to facilitate determining characteristics of its surrounding environment. To achieve the high energy radiation, a high-voltage power supply such as a voltage multiplier (e.g., a Cockcroft-Walton high-voltage ladder or other suitable voltage multiplier) may be implemented. However, in the confines of a downhole tool and/or to accommodate the downhole environment, the electrical components (e.g., capacitors, diodes, etc.) may be arranged in a compact manner for space efficiency. Furthermore, the electrical components may be operably held at high potential (e.g., greater than 100 kilovolts (kV) in relation to other components and/or a ground reference). To achieve a compact form factor, the electrical components may be arranged in a space-saving layout while assisting in combating the electric fields to reduce or eliminate electrical events such as arcing, tracking, field emission, and/or corona effects. Electrical protection and shielding may also be implemented around the high-voltage components of the downhole tool to help reduce or eliminate such electrical events. Additionally, in some embodiments, the arrangement may facilitate more efficient manufacture and/or troubleshooting/upkeep.

In one example, a downhole tool may include a high-voltage power supply disposed within a housing to transform input power to the downhole tool from a first voltage to a second voltage greater than the first voltage. The high-voltage power supply may include an array of capacitors, which may include multiple rows of capacitors. The rows of capacitors may be parallel with a symmetric cross section as viewed from an end of the array of capacitors. The high-voltage power supply may also include diodes electrically coupled to the array of capacitors.

In another example, a method may include forming an array of capacitors with multiple rows and forming a set of diodes disposed along the length of the rows. The rows may be generally parallel. The method may also include electrically coupling the set of diodes to the array of capacitors such that a first side of the array of capacitors has multiple alternating current (AC) capacitor rows and a second side of the array of capacitors has multiple direct current (DC) capacitor rows. Together, the array of capacitors and the set of diodes form a voltage multiplier.

In another example, a voltage multiplier may include an array of capacitors with four parallel rows of capacitors. The four parallel rows may be staggered in an axial direction along the length of the rows. The voltage multiplier may also include diodes electrically coupled to the array of capacitors such that a first side of the array of capacitors comprises two alternating current (AC) capacitor rows and a second side of the array of capacitors comprises two direct current (DC) capacitor rows. The diodes may also electrically couple the first side to the second side, and nodes of the two DC capacitor rows may be on opposite sides of the array of capacitors.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, wellbores may be drilled into the ground for reasons that may include discovery, observation, or extraction of resources. These resources may include oil, gas, water, or any other combination of elements within the ground.

Wellbores, sometimes called boreholes, may be straight or curved holes drilled into the ground from which resources may be discovered, observed, or extracted. During and/or after the formation of a wellbore, well logging may be practiced. Well logging may include making a detailed record of the geological formations penetrated by a wellbore, and is generally part of the discovery and observation of resources.

The exploration of what lies beneath the ground may be accomplished by a number of methods including surface and downhole techniques. The discovery and observation of resources using downhole techniques generally takes place down in the wellbore with downhole tools. These downhole tools may be a part of a tool-string that may be attached to a drill or other downhole device.

One particular type of downhole tool may include an electrically operated radiation generator for generating nuclear or photonic radiation (e.g., neutrons, gamma rays, x-rays, etc.) to facilitate determining characteristics (e.g., porosity and/or mineralogy) of the formation. As used herein, nuclear radiation shall include radiation of nuclear particles and/or photonic particles. Depending on the desired characteristics to be determined, various types of electrically operated radiation generators may be used, such as x-ray generators, gamma ray generators, or neutron generators. For example, in a downhole tool, a radiation generator may facilitate determining the porosity of surrounding formations, based at least in part on counts (e.g., number of neutrons or gamma-rays) of radiation, and/or determining the mineralogy of surrounding formations, based at least in part on a spectrum of radiation measured by a detector (e.g., scintillator).

Nevertheless, the different types of electrically operated radiation generators may use high-voltage power supplies to facilitate the generation of the nuclear radiation. For example, high-voltages may be used to produce electric fields to accelerate a particle (e.g., electron, ion, or other charged particle) toward a target. When the particle strikes atoms of the target, nuclear radiation may be generated and output from the downhole tool. The radiation may then interact with atoms in the surrounding environment (e.g., the formation) and a response detected.

In some scenarios, space and/or mobility within the wellbore may be limited based on the wellbore characteristics such as wellbore diameter, casing diameter, wellbore angle, and/or the presence of other downhole tools, debris, etc. As such, a smaller form factor for a downhole tool such as a radiation generator (e.g., less than 10 inches in diameter, less than 4 inches in diameter, less than 3 inches in diameter, less than 2 inches in diameter, or less than 1 inch in diameter) may assist in providing measurements in wellbores that larger downhole tools may be unable to obtain. Furthermore, the small form factor may further allow the wellbore diameter and/or casing diameter to be smaller, which may improve cost and/or time efficiency. To achieve such a small form factor, a high-voltage power supply may be arranged in a compact manner, while maintaining low electric field stresses such that arcing, tracking, field emission, and/or corona effects are reduced or eliminated.

For example, the high-voltage power supply may include a Cockcroft-Walton high-voltage ladder or other suitable multiplier ladder to generate such high-voltages (e.g., greater than 50 kilovolts (kV), greater than 100 kV, or greater than 400 kV). The electrical components (e.g., capacitors, diodes, wire leads, etc.) of the high-voltage power supply may be arranged in multiple rows in a side-by-side or staggered fashion. For example, in one embodiment, four rows of capacitors and one or more rows of diodes may be arranged parallel to one another and connected as a multiplier ladder. The quad arrangement of capacitors may provide efficient use of space in a generally cylindrical downhole tool.

Figure 1:
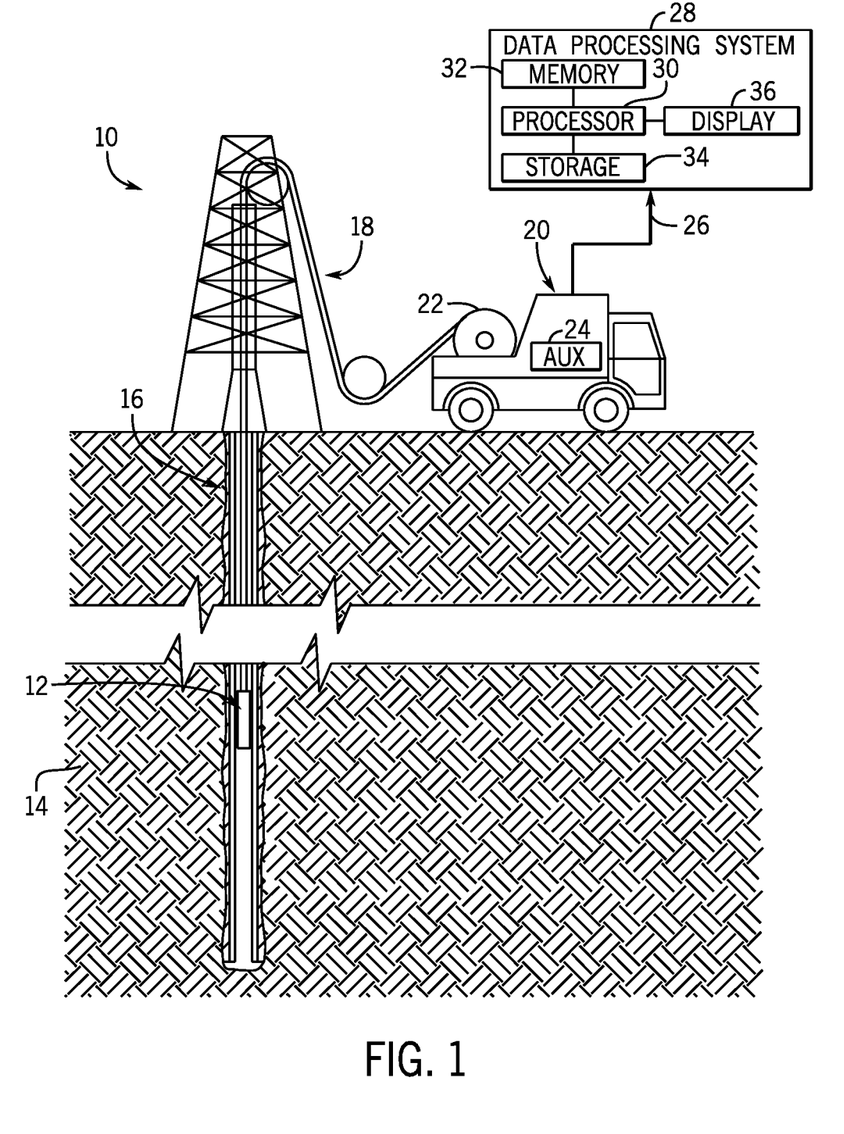
FIG. 1 is an example of a downhole tool system, in accordance with an embodiment.

With the foregoing in mind, FIG. 1 illustrates a well-logging system 10 that may employ the systems and methods of this disclosure. The well-logging system 10 may be used to convey a downhole tool 12 through a geological formation 14 via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool 12 using a high-voltage power supply, for example, to generate nuclear radiation within the wellbore 16 (e.g., downhole environment). As discussed further below, the downhole tool 12 may receive energy, for example, from the auxiliary power source 24 or other store/source of sufficient electrical energy and transform the voltage for use in producing nuclear radiation. Further, the supplied energy may be transformed to higher voltages within the wellbore 16, for example, via a high-voltage power supply within or proximate the downhole tool 12.

Control signals 26 may be transmitted from a data processing system 28 to the downhole tool 12, and data signals 26 related to the response of the formation 14 may be returned to the data processing system 28 from the downhole tool 12. The data processing system 28 may be any electronic data processing system 28 that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
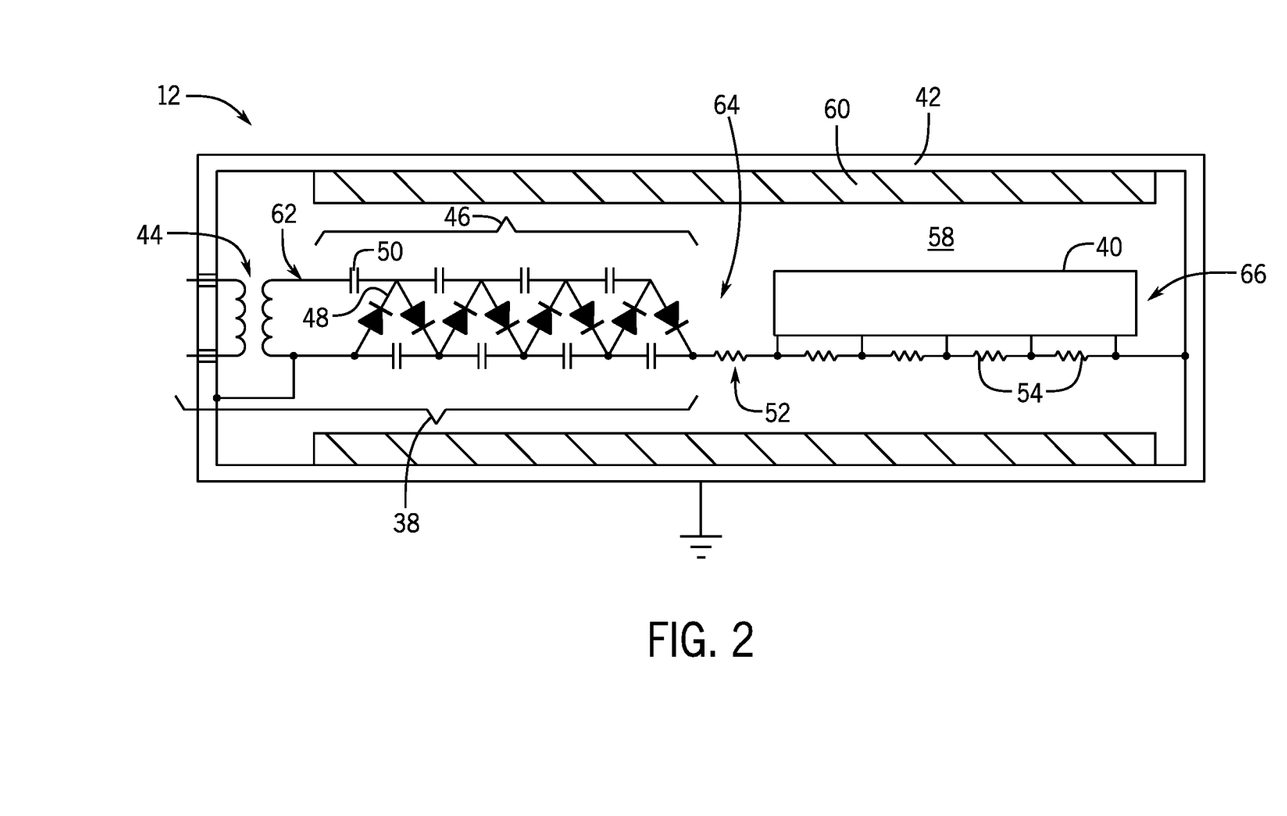
FIG. 2 is a cross-sectional view of an example downhole tool for generating nuclear or photonic radiation including an electrical insulator, in accordance with an embodiment.

As discussed above, the downhole tool 12 may include a high-voltage power supply 38 and a radiation generator 40 contained within a housing 42, as illustrated in FIG. 2. Although shown within the same housing 42, in some embodiments, the radiation generator 40 and high-voltage power supply 38 may be implemented in separate housings 42. The high-voltage power supply 38 may include, for example, an input transformer 44 and a voltage multiplier 46. In some embodiments, the voltage multiplier 46 may include diodes 48 and/or capacitors 50 arranged in a unipolar or bipolar ladder to generate a high voltage (e.g., greater than 50 kV, greater than 100 kV, or greater than 400 kV) to be output, for example, to the radiation generator 40. The voltage multiplier 46 may include, for example, a Cockcroft-Walton voltage multiplier ladder, a derivation thereof, or any suitable electrical circuitry for generating high-voltage within the confines of the downhole tool 12. In some embodiments, a surge resistor 52 may be used between the high-voltage power supply 38 and the radiation generator 40 to reduce or eliminate the effects of power surges, for example, due to arcing.

The radiation generator 40 may use the high-voltage power generated by the high-voltage power supply 38 to generate neutrons, gamma rays, x-rays, or other nuclear radiation. In some embodiments, biasing resistors 54 may step the generated high-voltage down over the length of the radiation generator 40 to create a graduated electric field in which charged particles (e.g., electrons, ions, etc.) are accelerated. In one embodiment, the radiation generator 40 may accelerate particles into a target to generate the nuclear radiation. To create the potential difference, and thus electric fields in the radiation generator 40, a reference voltage (e.g., relative ground) may be introduced, for example, via the housing 42. Maintaining the housing 42 at relative ground may also reduce electrical interference and/or discharge through the housing 42 to the environment. However, due to the high-voltage components (e.g., diodes 48, capacitors 50, resistors (e.g., the surge resistor 52, the biasing resistors 54, or other resistors), and/or the wires, solder joints, and leads thereto) used in such close proximity (e.g., less than three inches) to each other and the housing 42 at relative ground, electric field stresses may lead to electrical events such as arcing, insulation breakdown, surface tracking, corona events, field emission, etc.

In some embodiments, an insulating gas 58 (e.g., air, sulfur hexafluoride (SF6), etc.) or vacuum, may be hermetically sealed within the downhole tool 12 to assist in the prevention of the electrical events. Additionally or alternatively, an insulator 60 of high dielectric strength (e.g., perfluoroalkoxy (PFA), fluorinated ethylene propylene (FEP), and/or plastic, Kapton, or Teflon materials) may be used along the inner edge of the housing 42. In some embodiments, the insulator 60 may extend at least from the beginning 62 of the voltage multiplier 46 to an end 64 of the voltage multiplier 46. Moreover, the insulator 60 may also extend to an end 66 of the radiation generator 40. The insulator 60 may be affixed to the housing 42 of the downhole tool 12 and/or affixed to the internal components (e.g., high-voltage power supply 38, radiation generator 40, other electrical shielding, etc.) of the downhole tool 12. In some embodiments, the insulator 60 may be implemented as a film wound around shielding rings (e.g., corona rings) surrounding the internal components, as discussed below in reference to shown in FIG. 6.

Figure 3:
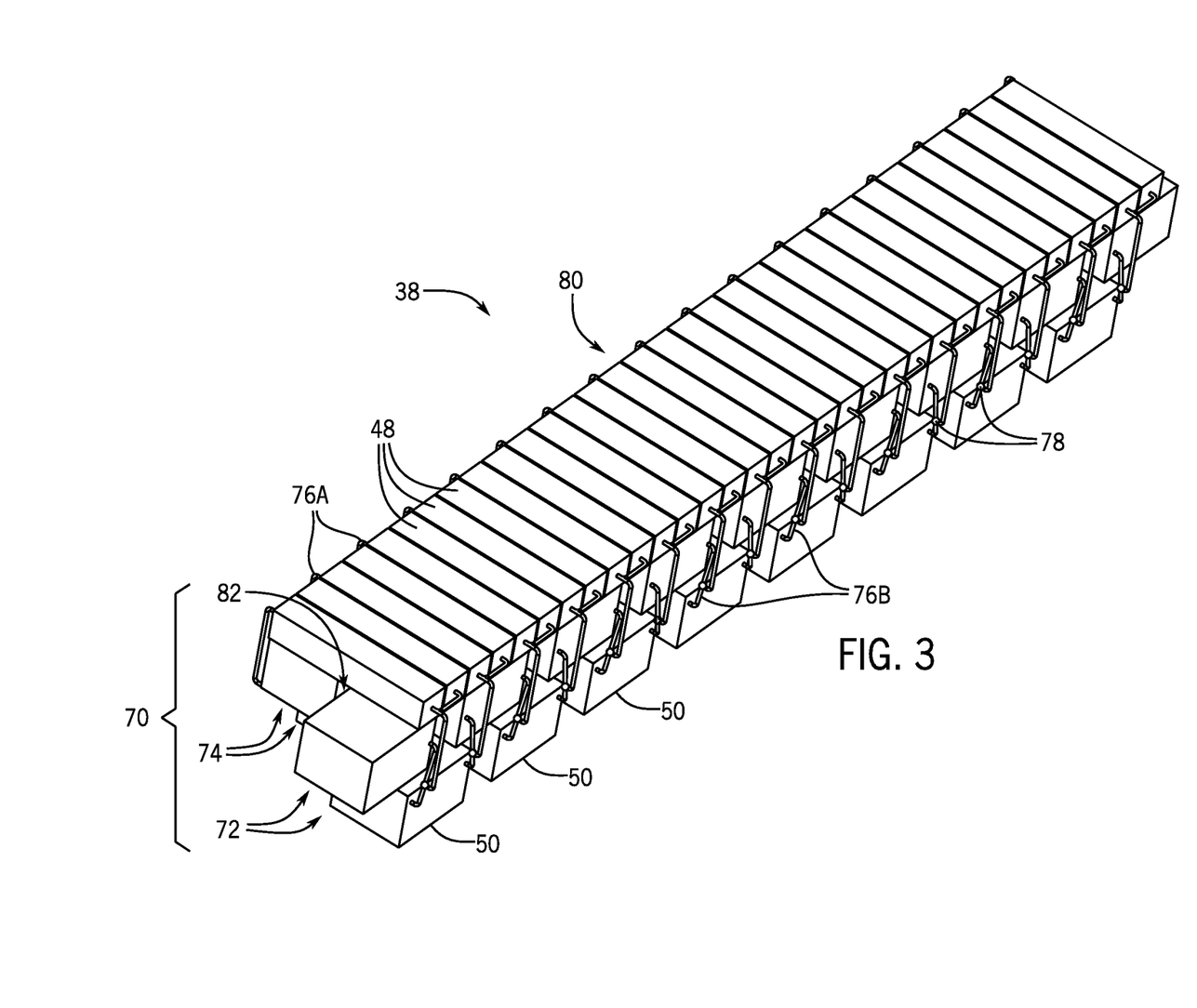
FIG. 3 is a perspective view of an example high-voltage power supply, in accordance with an embodiment.

As discussed above, the high-voltage power supply 38 may include an array 70 of capacitors 50 arranged in multiple parallel rows 72, 74, for example as depicted in perspective view of FIG. 3. For example, the array 70 may include two, four, six, eight, or more rows 72, 74 of capacitors 50 depending on implementation and size of the housing 42. As should be appreciated, the size, shape, and/or presence of additional components of the downhole tool 12 may facilitate different numbers of rows 72, 74. In some embodiments, four rows 72, 74 of capacitors 50 may make efficient use of the space within the housing 42, which may be generally cylindrical or rectangular.

Figure 4:
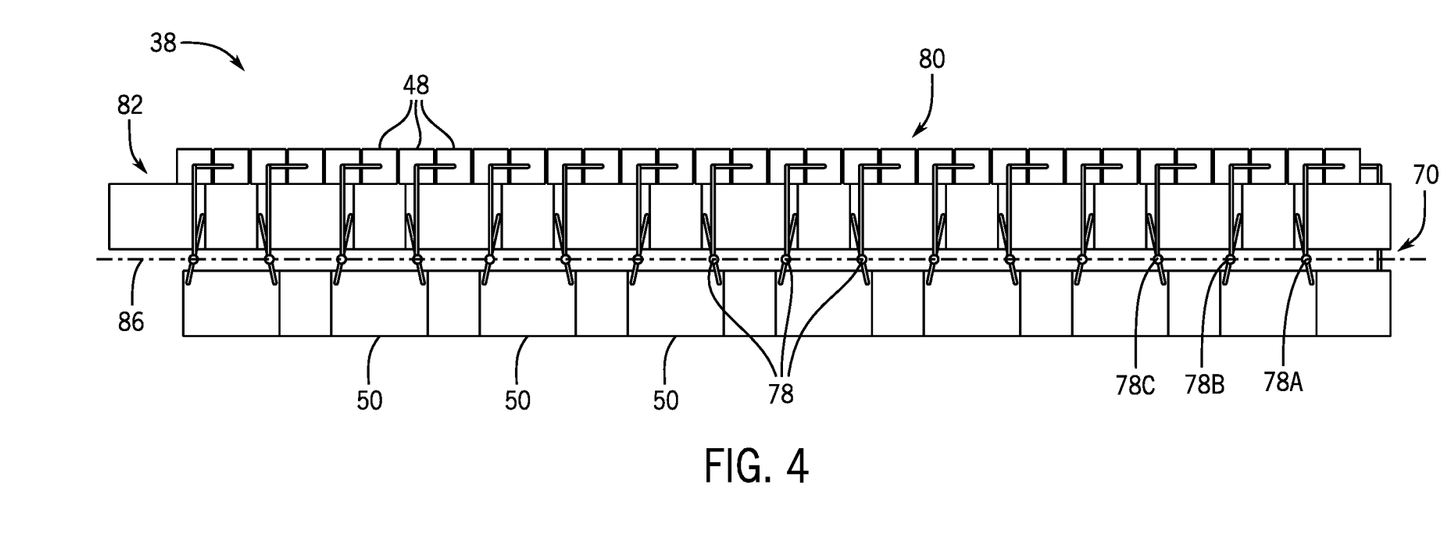
FIG. 4 is a side view of an example high-voltage power supply, in accordance with an embodiment.

In addition to providing space efficiency, the array 70 of capacitors 50 may also assist in reducing electrical events by separating the leads 76A, 76B with alternating current (AC) from those of direct current (DC). For example, the array 70 may include DC capacitor rows 72 and AC capacitor rows 74 with their associated leads 76B, 76A on opposite sides of the array 70. By maintaining the AC leads 76A away from the DC leads 76B the probability of electrical events may be reduced. Furthermore, the capacitors 50 in each row 72, 74 may be staggered to facilitate increased spacing between nodes 78 (e.g., electrical connections). Moreover, the staggering of the rows 72, 74, as well as the arrangement of rows 72, 74 in the array 70, may facilitate reduced electrical stress between nodes 78. For example, in some embodiments, the voltage difference between adjacent nodes 78 may be that of one multiplier stage of the high-voltage power supply 38. To help illustrate, FIG. 4 is a side view of the high-voltage power supply 38 with nodes 78A, 78B, and 78C. If, for example, node 78A represented the voltage of the high-voltage power supply 38 at a first multiplier stage, the voltage at the node 78A may be represented as 1V, where V is the voltage increase per multiplier stage. Subsequently, the voltage at node 78B and node 78C may be represented by 2V and 3V respectively. As such, the voltage differential between proximate nodes 78 may be that of a single stage to minimize electric field stresses.

Additionally, the high-voltage power supply 38 may include a set 80 of diodes 48 electrically connected between the AC capacitor rows 74 and the DC capacitor rows 72. In some embodiments, the set 80 of diodes 48 may be disposed on a side 82 of the array 70 of capacitors 50 spanning between the AC capacitor rows 74 and the DC capacitor rows 72. Furthermore, the placement of the diodes 48 on the side 82 of the array 70 may increase manufacturing efficiency and/or maintenance of the high-voltage power supply 38 due to the accessibility of diodes 48 and capacitors 50. The capacitors 50 in the AC capacitor rows 74 may be of the same or different type and/or rating than the capacitors 50 of the DC capacitor rows 72. As should be appreciated, the terms DC capacitor rows 72 and AC capacitor rows 74 may refer to the applied current and not necessarily the capabilities of the capacitors.

Figure 5:
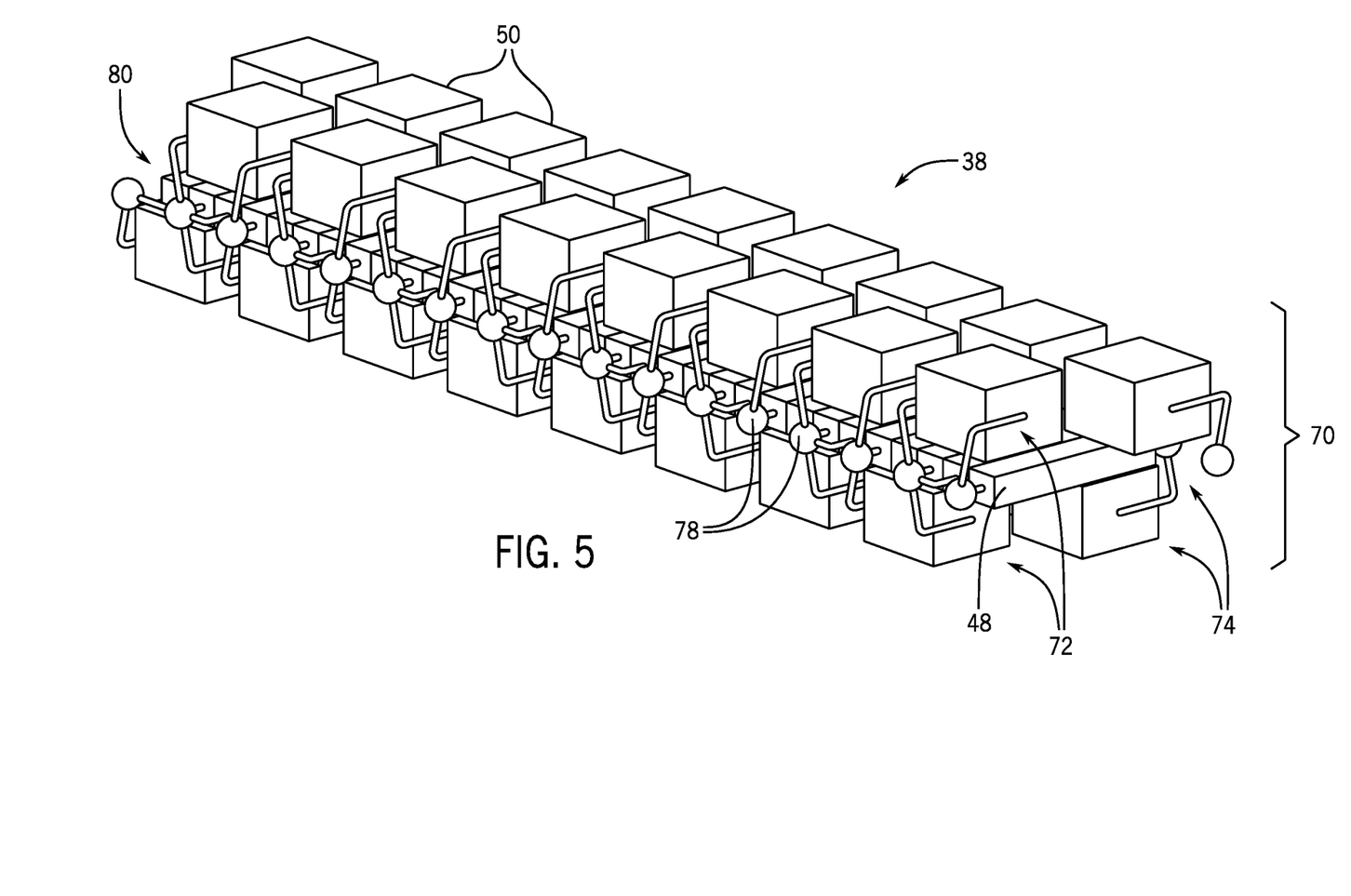
FIG. 5 is a perspective view of an example high-voltage power supply, in accordance with an embodiment.

Additionally or alternatively, a set 80 of diodes 48 may be disposed within the array 70 of capacitors 50, for example as illustrated in FIG. 5. Placement of the set 80 of diodes 48 between the rows 72, 74 of capacitors 50 may further reduce the form factor of the high-voltage power supply. Moreover, in some embodiments, depending on the sizes of the capacitors 50 and diodes 48, a set 80 of diodes 48 may be disposed both within the array 70 and on the side 82 of the array 70.

Figure 6:
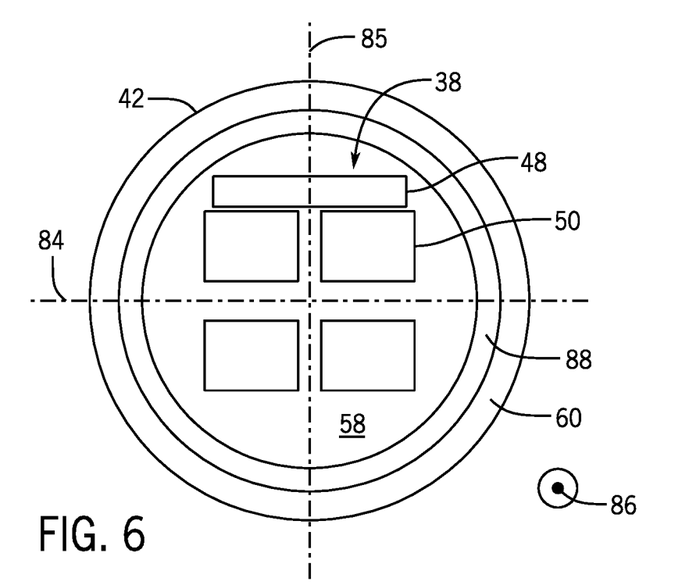
FIG. 6 is an end view of an example high-voltage power supply, in accordance with an embodiment.
Figure 7:
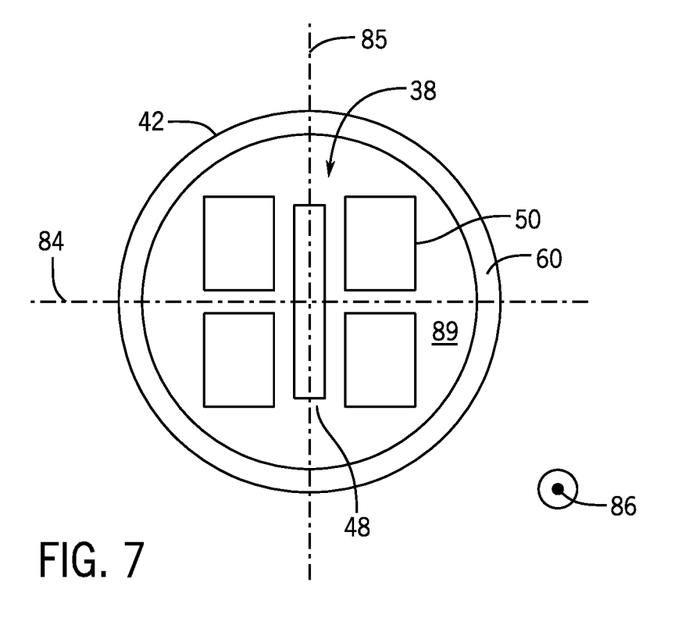
FIG. 7 is an end view of an example high-voltage power supply, in accordance with an embodiment.

FIGS. 6 and 7 are end views of the high-voltage power supply 38 of FIGS. 3 and 5, respectively, illustrating electrical shielding disposed around the high-voltage power supply 38. As stated above, the rows 72, 74 of the capacitors 50 may be generally parallel. Additionally, the rows 72, 74 of the array 70 may be generally symmetric about a first axis 84 and/or a second axis 85. Further, in some embodiments, the symmetry from the end view may be maintained with or without staggering in the axial direction 86. Furthermore, in embodiments of two AC capacitor rows 74 and two DC capacitor rows 72, the four rows 72, 74 may form a two-by-two cross-section.

In addition to facilitating smaller more compact downhole tools, the compact form of the high-voltage power supply 38 may also facilitate additional insulation between the high-voltage power supply 38 and the housing 42. In some embodiments, such additional insulation may facilitate higher operating voltages leading to increased and/or more reliable yield of generated radiation.

In some embodiments, the high-voltage power supply may be surrounded by a shielding ring 88. Shielding rings 88 may be implemented in a co-axial arrangement around the voltage multiplier 46 and/or the radiation generator 40 to reduce the electric field stresses proximate the electrical components of the downhole tool 12. In one embodiment, the shielding rings 88 may be generally conductive and made of any suitable metallic material or other conductor. Further, in one embodiment, the shielding rings 88 may be made of a semiconductor plastic. In some embodiments, the multiplier stages of the voltage multiplier 46 may be electrically connected to individual shielding rings 88 spaced axially apart and radially around the array 70 of capacitors 50. By maintaining the shielding rings 88 at approximately the same potential as the electrical components within the circumference of the shielding rings 88, the electric fields and corresponding electric field stresses and, therefore, electrical events within the shielding rings 88 may be reduced.

In some embodiments, the high-voltage power supply may be generally disposed in an insulating gas 58 and/or potted (e.g., surrounded and/or encased) in a non-conductive or slightly conductive material to further reduce electrical field stresses as depicted in FIG. 7. As should be appreciated, potting material 89 may also be used within or around shielding rings 88, and potting material 89 may likewise be used with or without shielding rings 88. For example, the potting material 89 may have a conductivity greater than $10^{-16}$ S/m and/or a conductivity less than $10^{-4}$ S/m, less than $10^{-8}$ S/m, or less than $10^{-16}$ S/m such as boron nitride with a silicon elastomer (e.g., Sylgard). Furthermore, in some embodiments, the potting material 89 may be more conductive than the insulator 60 and/or the shielding rings 88. The potting material 89 may form a cylindrical tube around the high-voltage power supply or other suitable shape conforming to the shape of the housing 42.

Figure 8:
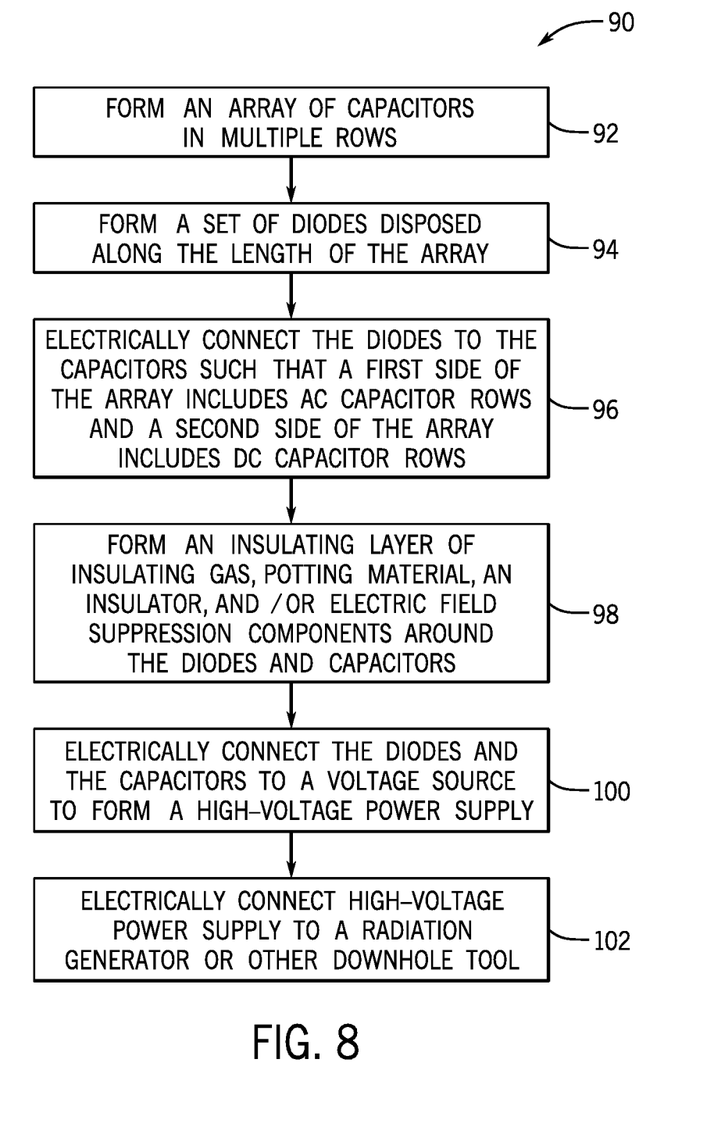
FIG. 8 is a flowchart of an example process for manufacturing a high-voltage power supply, in accordance with an embodiment.

FIG. 8 is a flowchart 90 of an example process for manufacturing the high-voltage power supply 38. An array 70 of capacitors 50 may be formed in multiple rows 72, 74 (process block 92). Additionally, a set 80 of diodes may be formed that is disposed along the length of the array 70 (process block 94). Furthermore, the diodes 48 and capacitors 50 may be electrically connected such that a first side of the array 70 includes AC capacitor rows 74 and a second side of the array 70 includes DC capacitor rows 72 (process block 96). In some embodiments, the first side may be opposite from the second side. Furthermore, the diodes may be disposed on a third and/or fourth side of the array 70 and/or between the capacitors 50 of the array 70. An insulating layer of insulating gas 58, potting material 89, an insulator 60, and/or electric field suppression components (e.g., shielding rings 88) may be formed around the diodes 48 and/or capacitors 50 (process block 98). The diodes 48 and capacitors 50 may also be electrically connected to a voltage source to form a high-voltage power supply 38 (process block 100), for example, via multiple layers of insulating film. Furthermore, the high-voltage power supply 38 may be electrically connected within a downhole tool 12 (e.g., connected to a radiation generator 40) (process block 102). Additionally, in some embodiments, the high-voltage power supply and/or the radiation generator may be disposed in a housing 42 for the downhole tool 12.

Although the above referenced flowchart 90 is shown in a given order, in certain embodiments, the depicted steps may be reordered, altered, deleted, and/or occur simultaneously. Additionally, the referenced flowchart 90 is given as an illustrative tool, and further decision and/or process blocks may be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A voltage multiplier comprising:
an array of capacitors comprising four parallel rows of capacitors, wherein the four parallel rows of capacitors are staggered in an axial direction along a length of the four parallel rows of capacitors; and
a plurality of diodes, wherein the plurality of diodes are electrically coupled to the array of capacitors such that a first side of the array of capacitors comprises two alternating current (AC) capacitor rows and a second side of the array of capacitors comprises two direct current (DC) capacitor rows, wherein the plurality of diodes electrically couple the first side to the second side;
a plurality of AC nodes, wherein each AC node of the plurality of AC nodes is coupled to one capacitor from each of the two AC capacitor rows;
a plurality of DC nodes, wherein each DC node of the plurality of DC nodes is coupled to one capacitor from each of the two DC capacitor rows, wherein the plurality of AC nodes and the plurality of DC nodes are on opposite sides of the array of capacitors, and wherein each diode of the plurality of diodes is coupled to one of the plurality of AC nodes and one of the plurality of DC nodes, wherein each of the diodes of the plurality of DC nodes are disposed perpendicular to the length of the four parallel rows of capacitors along the length of the four parallel rows of capacitors.

2. The voltage multiplier of claim 1, comprising:
potting material disposed around the array of capacitors;
a shielding ring disposed around the array of capacitors; and
an insulator disposed around the potting material and the shielding ring.

3. The voltage multiplier of claim 1, wherein the plurality of diodes are disposed, lengthways along an axis perpendicular to the axial direction, between the two AC capacitor rows, and between the two DC capacitors rows.

4. The voltage multiplier of claim 1, wherein the plurality of diodes are disposed on an exterior surface of the array of capacitors.

* * * * *